H. G. KNODERER.
CONDUIT COUPLING DEVICE.
APPLICATION FILED OCT. 27, 1920.

1,425,781.  Patented Aug. 15, 1922.

Inventor:
Homer G. Knoderer,
by *Albert G. Davis*
His Attorney.

UNITED STATES PATENT OFFICE.

HOMER G. KNODERER, OF ENGLEWOOD, NEW JERSEY, ASSIGNOR TO GENERAL ELECTRIC COMPANY, A CORPORATION OF NEW YORK.

CONDUIT-COUPLING DEVICE.

1,425,781. Specification of Letters Patent. Patented Aug. 15, 1922.

Application filed October 27, 1920. Serial No. 419,979.

*To all whom it may concern:*

Be it known that I, HOMER G. KNODERER, a citizen of the United States, residing at Englewood, in the county of Bergen, State of New Jersey, have invented certain new and useful Improvements in Conduit-Coupling Devices, of which the following is a specification.

My invention relates to means for coupling electric conduits to conduit bodies or outlet boxes, and it is particularly adapted for boxes of the separable hub type. My invention is primarily intended for use in conduit systems of the exposed type, although certain features thereof have a broader application.

An object of my invention is to provide an arrangement of parts which shall facilitate ready and rapid connection of conduits to outlet boxes.

A further object of my invention is to provide an arrangement of parts which shall enable an outlet box to be readily adjusted to any angular position with respect to the conduit and firmly and rigidly clamped in such position without disturbing the connection between the conduit and hub, thereby insuring a good electrical connection between the metal parts of the conduit system whenever a good mechanical connection is made with the box.

My invention will be better understood from the following description taken in connection with the accompanying drawing and its scope will be pointed out in the appended claims.

Figure 1:
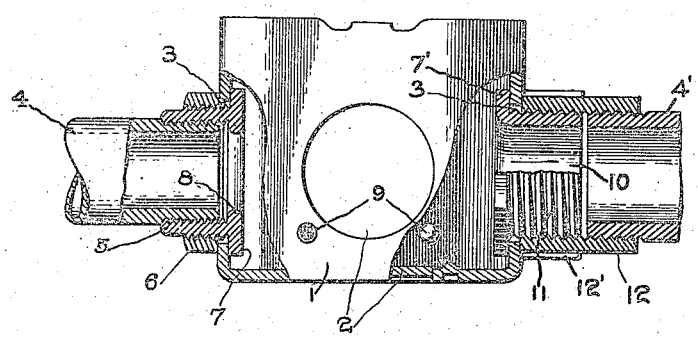
Figure 2:
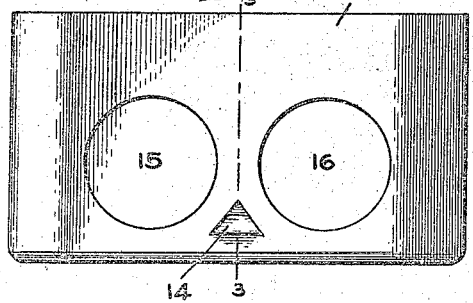
Figure 3:
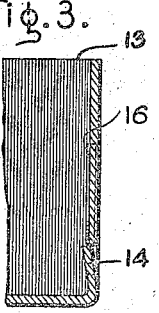
Figure 4:
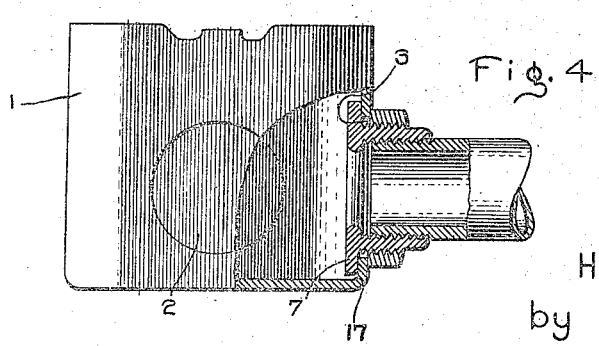
Figure 5:
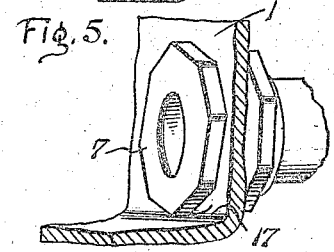

Referring to the drawing, Fig. 1 is a side view showing the preferred form of my invention, certain parts being shown in section; Fig. 2 is an elevation of a modified construction; Fig. 3 is a section on the line 3—3 of Fig. 2, Fig. 4 is a side view with certain parts shown in section of a further modification, and Fig. 5 is a perspective view with parts broken away showing the nut locking feature of Fig. 4.

Referring to Fig. 1, the outlet box 1 is provided with any desired number of openings in the walls thereof for making conduit connections thereto. As is well known in the art, these openings are customarily provided with removable closures which permit of making conduit connections at the desired point or points in the side or bottom walls of the box. Such removable closures are indicated in the drawing at 2. The box is shown as provided with separable hubs for making conduit connections to opposite sides of the box. The closure has been removed from the opening 3 in the left hand side of the box to enable a conduit connection to be made to the conduit 4. The conduit in this case is smaller than the opening in the wall of the outlet box and the conduit connection is made by the reducing bushing 5. The bushing 5 is internally threaded to engage the conduit 4 and is externally threaded to engage with the clamping nut 6. The bushing 5 projects through the opening in the wall of the box and is provided with a flange 7 located inside the box and this flange is provided with a polygonal periphery to enable the same to be readily turned or held in any desired position. The bushing or outlet member 5 is also provided with a rounded internal shoulder 8 on the same end of the bushing as the flange 7 to prevent abrasion of conductors leading from the conduit into the outlet box, and to provide an abutment for the end of the conduit where the conduit has been provided with such a long thread that the conduit does not bind in the coupling member before the shoulder is reached by the end of the conduit. In order to facilitate the making of the conduit connections and to insure a firm and rigid connection between the outlet box and hub, I provide each wall of the box with an offset portion 9, arranged adjacent each opening therein in a position to engage the corners of the polygonal periphery of the flange 7, which corners constitute locking means rotatable with the outlet member, to lock the same against turning with respect to the box just prior to the seating of the flange 7 against the wall of the box. These offset portions may be made by punching in a small section of the metal of the wall of the box, which metal is usually steel and may be drawn sufficiently to form projections or nubs inside the box without actually making openings through the box walls.

In order to make this reducing coupling connection, the workman first removes the closure from the box so as to enable the conduit connection to be made in the desired direction. He then inserts the bushing 5 into the opening and clamps it firmly in place by the nut 6. When thus clamped in place, flange 7 engages offset portion 9 whereby the bushing 5 and the outlet box are held against turning movement relatively to each other. He then turns the box and hub together until a firm and rigid threaded connection is made with the conduit. If it is then found that the box does not occupy the desired angular relation with the conduit, he backs off the nut 6 to a slight extent and then by a slight endwise movement of the bushing through the box releases the locking engagement between the bushing and the offset portion 9 of the box. The box may then be turned to the desired position, after which the nut 6 is tightened to clamp the box firmly in place. It will be observed that in making this angular adjustment of the box it is unnecessary to disturb the threaded connection between the outlet member 5 and conduit 4. Thus, whenever a good mechanical connection is established with the box a good electrical connection is established between all the metal parts of the conduit system. The maintenance of a good electrical connection between these parts is of great importance since it enables all parts of the conduit system to be thoroughly grounded. If there are obstructions which closely define the position of the box so that it cannot be turned to make a conduit connection, the connection may nevertheless be readily made by inserting the bushing into the opening and threading the conduit into the bushing. Where two conduit systems are being connected together and the conduit cannot be turned because of a coupling made at the other end thereof, the bushing will be turned until it firmly engages the conduit, after which the nut 6 will be turned to clamp the wall of the box firmly in place. The nut 6 being accessible and thereby easily turned, enables a firm and rigid connection to be made between the conduit and box without the difficulty that is experienced in those arrangements utilizing a clamping nut inside the box.

The conduit connection shown at the right hand side of the box in Fig. 1 represents a connection between a conduit 4' of a size corresponding to the opening in the wall of the box. In this case the outlet member 10 is provided with a screw threaded projection 11 for insertion through the opening 3. This outlet member is provided with a flange 7' provided with a polygonal head. The wall of the outlet box is clamped between the flange 7' and the coupling member 12 which is in threaded engagement with the conduit 4' and the outlet member 10. The member 12 may, if desired, be provided with ribs 12' to enable the same to be more readily turned.

In making this type of conduit connection the workman will ordinarily insert the outlet member 10 through the opening 3 in the wall of the box and thread the coupling member 12 thereon firmly to clamp the same to the box, after which he will thread the conduit 4' into the coupling member until it is firmly held there by the tapered threads thereon or by the abutting of the end of the conduit against the end of the outlet member 10. He may, if desired, however, first thread the coupling member 12 firmly on to the conduit 4', then insert the outlet member 10 through the opening in the wall of the box and thread it into the coupling member 12 by turning either the outlet member or the conduit and coupling member together. In either case, when the flange 7 is prevented from further turning by the offset portion 9 the coupling member 12 and conduit 4' will be turned together the slight extent necessary to clamp the wall of the box firmly in place. Upon slightly backing off the coupling member 12, the angular position of the box may be readily adjusted as heretofore described in connection with the reducing coupling shown at the left hand side of the box.

Where two conduit systems are being connected together and the conduit 4' cannot be turned because of a coupling made at the other end thereof, the workman will run an extra long thread upon the conduit thus giving a few straight or untapered threads. The outlet member will then be threaded into the coupling member until it firmly butts against the end of the conduit, after which the coupling member will be turned upon the threads of the outlet member and conduit to clamp the box firmly and rigidly in place. The abutting relation of the conduit and outlet member causes a binding action in the threads of the coupling member and insures a good electrical connection. This binding action is, however, not sufficient to prevent the coupling member, which is readily accessible, from being turned to clamp the box in place.

In the modification shown in Figs. 2 and 3, the outlet box 13 is provided with a portion 14 offset from the wall of the box to engage the polygonal head of the outlet member. This offset portion 14 is preferably formed by making an inverted V-shaped cut in the wall of the box and pressing the point of the V inwardly to a slight extent. The box shown in Fig. 2 is indicated as provided with a plurality of removable closures 15 and 16 in the same wall of the box and the offset portion is here so located with respect to the openings that it may perform its locking function for conduit connections to be established in either of the openings.

In the modification of my invention shown in Fig. 4, the offset portion of the wall of the box for locking the polygonal head of the outlet member is made by arranging the walls of the box to meet in a curved inner edge 17 so located as to be engaged by the corners of the polygonal flange 7 just prior to the seating of this flange against the wall of the box. The cooperative relationship of the parts is shown more clearly in Fig. 5. A slight endwise movement of the outlet member with respect to the box permits the polygonal head to turn freely within the box.

In connection with my invention, it will be noted that when the conduit ends are fastened to the box or boxes, the engaging means between the fastening means and the box or boxes serves to lock the conduit ends rigidly to the box or boxes. As a result a wiring installation comprising conduits and boxes embodying my invention forms a continuous rigid conduit system in which the boxes and conduit lengths are positively locked together against turning movement relatively to each other. Because of this locking together of the parts it is not necessary in making an installation to fasten each box to the wall in order to comply with the rules of the Underwriters' Laboratories. This is an important consideration for in making installations comprising a number of boxes, it is often inconvenient and objectionable to fasten every box individually to the wall, particularly where the boxes are relatively close together. By locking or rigidly fastening the box or boxes to the conduit ends, I form a continuous rigid conduit structure which may be installed by fastening it at such points as are found most convenient.

While I have shown and described certain specific embodiments of my invention, it is apparent to those skilled in the art that modifications may be made without departing from the spirit of my invention, and I therefore aim to cover all such modifications and variations as fall within the scope of my invention as defined in the appended claims.

What I claim as new and desire to secure by Letters Patent of the United States, is:—

1. The combination of an outlet box of the class described having an opening in a wall thereof, means for making a conduit connection to said box comprising a screw-threaded outlet member projecting through said opening and rotatable therein, said outlet member being provided with locking means rotatable therewith, the wall of the box being provided with an offset portion adjacent the opening therein adapted to engage said locking means to prevent rotation of the outlet member when the outlet member approaches its final position to complete the connection.

2. The combination with an outlet box of the class described, of a separable hub for making a conduit connection thereto comprising a member threaded to engage a conduit and a member coöperating with said conduit engaging member to clamp the wall of the box firmly and rigidly between said members, characterized by the fact that locking means releasable upon a slight endwise movement of the conduit engaging member is provided for holding one of said members against rotation with respect to the box in any one of a plurality of positions within the box whereby the box may be securely clamped in any desired angular relation to the conduit without disturbing the threaded connection between the coupling member and conduit.

3. The combination of an outlet box of the class described having an opening in a wall thereof and means for making a conduit connection to said box comprising a screw-threaded member having a polygonal periphery and a surface adapted to engage the wall of the box around said opening to clamp the box in place, characterized by the fact that the wall of the box is provided with an offset portion arranged to engage with a part of the polygonal periphery of the screw-threaded member and lock the same against rotation just prior to the engagement of the clamping surface of said member with the wall of the box.

4. The combination of an outlet box of the class described having an opening in a wall thereof for making a conduit connection, a screw-threaded outlet member projecting through the opening and having a flange provided with a polygonal head within the box, a member having screw threads arranged to coöperate with said outlet member to seat said flange against the wall of the box to clamp the box in place, characterized by the fact that the wall of the box is provided with an offset portion arranged to engage with a part of the polygonal head of the outlet member and lock the same against rotation just prior to the seating of the flange against the wall of the box.

5. An outlet box of the class described having adjacent walls thereof substantially at right angles to each other and meeting to form a curved edge, one of said walls being provided with an opening for making a conduit connection to said box, characterized by the fact that the opening is located sufficiently close to the inner edge of the box to permit the curved surface to act as a nutlock for conduit securing means.

6. The combination of an outlet box of the class described having adjacent walls thereof substantially at right angles to each other and meeting to form a curved edge, one of said walls being provided with an opening, a screw-threaded outlet member projecting through the opening and having a flange provided with a polygonal head within the box, a member having screw threads arranged to cooperate with said outlet member to seat said flange against the wall of the box to clamp the box in place, said opening in the wall of the box being arranged adjacent said curved edge so that the polygonal head of said outlet member shall engage said curved surface to lock said outlet member against rotation.

In witness whereof, I have hereunto set my hand this 26th day of October 1920.

HOMER G. KNODERER.